United States Patent [19]

Vantillard et al.

[11] Patent Number: 4,732,787

[45] Date of Patent: Mar. 22, 1988

[54] VARNISHES WITH HIGH HARDNESS, RESISTANT TO ABRASION, PROCESS FOR THEIR PREPARATION, AND APPLICATION OF THESE VARNISHES TO COATING OF SOLID SUBSTRATES

[75] Inventors: Alain Vantillard, Sainte-Foy-les-Lyon; Joel Pellenc, Charly; Claude Verne, Bron, all of France

[73] Assignee: Societe la Celliose S.A., Pierre Benite, France

[21] Appl. No.: 862,615

[22] Filed: May 13, 1986

[30] Foreign Application Priority Data

May 13, 1985 [FR] France .................. 85 07806

[51] Int. Cl.$^4$ .............................. C08K 3/36
[52] U.S. Cl. ......................... 427/386; 524/265; 524/542; 524/597; 524/837; 524/868
[58] Field of Search ............... 524/542, 597, 265, 837, 524/868; 525/474, 510; 427/386

[56] References Cited

U.S. PATENT DOCUMENTS

| | | | |
|---|---|---|---|
| 4,049,861 | 9/1977 | Nozari | 427/386 |
| 4,223,072 | 9/1980 | Baney et al. | 428/412 |
| 4,293,606 | 10/1981 | Zollinger et al. | 427/386 |
| 4,355,135 | 10/1982 | January | 524/767 |
| 4,382,983 | 5/1983 | Yuyama et al. | 427/386 |

FOREIGN PATENT DOCUMENTS 2047721 12/1980 United Kingdom.

*Primary Examiner*—Lewis T. Jacobs
*Attorney, Agent, or Firm*—Browdy and Neimark

[57] ABSTRACT

A hard, abrasion resistant varnish, for coating the surfaces of solid substrates, comprises a solution in a mixture of solvents:

a—4 to 90% by weight, in relation to the total of constituents (a), (b) and (c), of a colloidal silica, b—9 to 95% by weight, in relation to the total of constituents (a), (b) and (c), of the product of hydrolysis and partial condensation of at least one trialkoxysilane;

c—1 to 87% by weight, in relation to the total of constituents (a), (b) and (c), of the product of hydrolysis and partial condensation of at least one epoxidized trialkoxysilane;

d—0.5 to 9% by weight, in relation to the total of constituents (a), (b) and (c), and (d), of a soluble melamine-formaldehyde and urea-formaldehyde resin.

The varnish can optionally contain an acid hardener and secondary adjuvants such as dyes, film tension agents and agents for protection from light.

The varnish in contact with the solid substrate to be coated is hardened by heating at about 120° for a time not exceeding 2 hours.

12 Claims, No Drawings

VARNISHES WITH HIGH HARDNESS, RESISTANT TO ABRASION, PROCESS FOR THEIR PREPARATION, AND APPLICATION OF THESE VARNISHES TO COATING OF SOLID SUBSTRATES

This invention relates to varnishes with high hardness, resistant to abrasion, and which, intended to coat the surfaces of relatively soft solid substrates, are of the type of those essentially having a base of epoxidized or nonepoxidized polysiloxanes, of colloidal silica and aminoplast resin.

The slight surface hardness of unchanged thermoplastic materials makes them very sensitive to abrasion and scorings, which rapidly causes a degradation of their appearance. Also efforts have been made for many years to make them less vulnerable by coating them with various types of varnish, with a higher hardness than that of the underlying material.

Also, most of the vacuum metallized plastics and some metals, such as gold, silver, aluminum, copper, brass or bronze in certain cases need protective coatings to maintain a pretty appearance of the surface throughout their use.

The general problem of varnishes with high hardness, resistance to abrasion, for coating of soft solid substrates, has been the origin of numerous works that still have not ended in totally satisfactory solutions.

It was proposed, for example, in U.S. Pat. No. 4,018,941 to use inexpensive coatings with a base of thermosetting polyurethanes. But these coatings are not sufficiently hard.

Another more widely explored research path is that which consists in using inorganic and/or organic silicon derivatives. Solutions with a silica base or compositions containing a polysilicic acid and fluoro copolymer have proved to be either too sensitive to moisture or too expensive.

Use of organopolysiloxanes was then turned to. U.S. Pat. No. 3,935,346 claims, for coating of plastics, solutions containing the product of partial condensation of a silanol and, as hardening promoter, a partially condensed methylated and isobutylated melamine-formaldehyde resin.

Various documents recommend the use of hydrolyzable silanes with epoxide functions which can be hardened by various means:
perfluorosulfonic acid or perfluoro sulfonyl derivative, according to the patent application filed in the German Federal Republic under No. 2,609,148;
polycarboxylic acid or its anhydride, in the presence of a catalyst, according to British patent application No. 2,044,787;
aluminum chelate, according to U.S. Pat. No. 4,211,823.

According to German patent application No. 3,021,018, compositions containing a product of hydrolysis and precondensation of a trialkoxysilane, optionally associated with a tetraalkoxysilane, a carboxylic acid and a fluoro anionic surfactant, are suitable for coating plastics.

The introduction of colloidal silica into coatings with a base of polysiloxanes marked a certain advance in resistance to abrasion.

Various compositions of this type have been described, for example, in U.S. Pat. Nos. 3,708,225; 3,976,497 and 3,986,997. The flexibility of these coatings can be improved, according to French patent application No. 2,412,595, by incorporation of a phenyltrisilanol besides the methyltrisilanol usually used. These compositions all exhibit an acid pH. Close combinations, but with a slightly basic character, are described particularly in Belgian Pat. No. 885,533 and in French patent application No. 2,474,044.

An attempt was also made to improve these coating compositions by addition of a polysiloxane/polyether copolymer, as indicated in German applications Nos. 2,947,879 and 3,016,021.

To filter ultraviolet radiations, Frech patent application No. 2,446,308 associates colloidal titanium oxide with colloidal silica. The adherence of the coatings is increased and the backing time reduced if, as U.S. Pat. No. 4,311,763 claims, small amounts of a beta-hydroxyacetone are used. For its part, German patent application No. 2,914,427 proposes improving the elasticity and adherence of coatings by addition of a blocked polyisocyanate to the colloidal silica and partially hydrolyzed siloxane. The compositions claimed can also contain a small proportion of a completely etherified methylolmelamine.

According to French patent application No. 2,454,455, economical coatings are obtained by including both colloidal silica and a small amount of hydrolyzable silane in a hardenable melamine resin.

Finally, French application No. 2,515,667 claims dyeable coatings, made of colloidal silica and products of partial condensation of epoxidized silanols, optionally associated with nonepoxidized silanols, cross-linked by dicarboxylic acid; or anhydrides of carboxylic acids, or diamides, in the presence of catalysts such as metal acetylacetonates, diamides, amines, imidazoles, sulfonic acids and their amine salts, or the alkaline salts of carboxylic acids.

The various solutions that the prior art has tried to bring to the problem of coatings resistant to abrasion all exhibit at least one of the following defects, being due either to insufficient performances or to complications in use:
not sufficiently hard;
insufficient resistance to abrasion;
lack of flexibility;
requirement for an undercoat to obtain adherence to plastics;
too high temperature and/or baking time.

SUMMARY OF THE INVENTION

This invention remedies all these drawbacks by providing transpaent coatings, vary hard, but sufficiently flexible with high resistance to abrasion, which require backing times of only one to two hours at temperatures of about 120° C. Adherence to the thermoplastic occurs directly and proves to be excellent. Use of an acrylic undercoat is necessary at times on metals. The varnish compositions according to the invention are solutions in a mixture of solvents of the following constituents:
a—4 to 90% by weight, in relation to the total of constituents (a), (b) and (c), of a colloidal silica,
b—9 to 95% by weight, in relation to the total of constituents (a), (b) and (c), of the product of hydrolysis and partial condensation of at least one nonepoxidized trialkoxysilane,
c—1 to 87% by weight, in relation to the total of constituents (a), (b) and (c), of the product of hydrolysis and partial condensation of at least one trialkoxysilane containing epoxy group, d—and 0.5 to 9% by weight, in relation to the total of constituents (a), (b) and (c), of a soluble aminoplast resin (d).

Although the compositions according to the invention use only raw materials already known for this application, their superiority in comparison with the compositions already described appears due to the simultaneous use of two types of epoxidized and nonepoxidized alkoxysilanes, in a total proportion greater than 11% in relation to the colloidal silica, and a soluble aminoplast resin, in a proportion less than or equal to 9% in relation to the total of alkoxysilanes and of colloidal silica. Constituent (a) is a colloidal silica in acid or basic aqueous dispersion, having particles of a diameter of 1 to 150 nanometers. However, preferably dispersions are used having particle sizes of about 10 to 30 nanometers, which are more stable and impart better optical properties to the coatings. Such dispersions of colloidal silica are commercially available under registered trademarks "LUDOX" of the PONTS DE NEMOURS company and "NALCOAG" of the NALCO company. Constituent (b) is the product of a hydrolysis and partial condensation of product of at least a nonepoxidized trialkoxysilane, having the following formula:

R—Si(OR')$_3$ in which R represents a radical selected from the group of alkyl radicals containing from 1 to 4 carbon atoms and chloro-3-propyl, trifluoro-3,3,3-propyl, mercapto-3-propyl, methacryloxy-3-propyl, vinyl and phenyl radicals; while R' is an alkyl radical containing from 1 to 4 carbon atoms or an alkoxyalkyl radical containing from 2 to 4 carbon atoms. Part of nonepoxidized trialkoxysilane, which can represent up to 30% of its mass, can be replaced by a dialkoxysilane and/or by a tetraalkoxysilane. Constituent (c) is the product of hydrolysis and partial condensation of at least an epoxidized trialkoxysilane having the following formula:

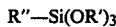
R''—Si(OR')$_3$ in which R'' represents a radical containing an epoxide group and R' has the same meaning at above. As examples of radicals R'', there can be cited the following:

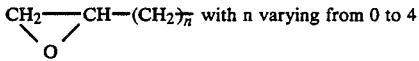

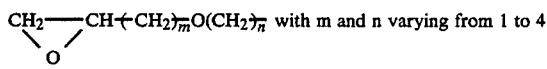

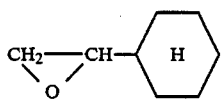

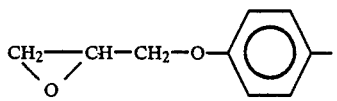

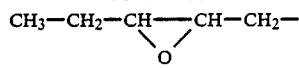

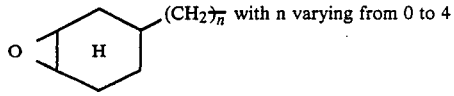

Constituent (d) is a soluble aminoplast resin, which can be of the melamine-formaldehyde or urea-formaldehyde type. The methylol functions of this resin can be etherified totally or partially by aliphatic alcohols containing from 1 to 4 carbon atoms. Such resins are available on the market under various registered trademarks, such as "LUWIPAL" of BASF, "CYMEL" of AMERICAN CYANAMID Co, "DYNOMIN" of DYNO CYANAMID, "MAPRENAL" of HOECHST, "PLASTOPAL" of BASF or "RESAMIN" of HOECHST.

Constituents (a), (b), (c) and (d) together represent a proportion of 10 to 50% by weight of final varnish. The rest consists essentially of a mixture of solvents, which comprise water slightly acidulated by carboxylic acid and lower aliphatic alcohols containing from 1 to 5 carbon atoms. Various other water-miscible polar solvents such as glycols and their ethers, ketones, esters, can go into the mixture of solvents. Apolar solvents, not miscible with water but miscible with the preceding mixture, such as aromatic hydrocarbons, can also be used in the compositions. The choice of the mixture of solvents is adapted by one skilled in the art to the industrial application requirements and to the nature of the solid substrate to be coated. Actually, the solvents used, after a more or less extended contact with the support, should not crack it or cause it to become fragile.

The varnishes according to the invention can also contain various secondary adjuvants such as dyes, surface tension agents or agents improving the behavior under ultraviolet radiations. A hardening acid catalyst such as hydrochloric acid, acetic acid or paratoluenesulfonic acid, can be added in slight amounts to reduce the baking time still more, but its use is generally not necessary.

The preparation of the varnishes according to the invention can be performed continuously by slowly pouring, with stirring, the mixture of epoxidized and nonepoxidized alkoxysilanes into the aqueous dispersion of colloidal silica, previously acidulated to pH 3 with formic acid or acetic acid. The time required for pouring the alkoxysilanes is generally from 30 to 60 minutes, and during the entire pouring, the temperature of the reaction mixture is kept below 45° C.

In a preferred mode of operation, the nonepoxidized alkoxysilane or alkoxysilanes are poured into the dispersion of colloidal silica first, hydrolysis is allowed to continue for about fifteen minutes, then the epoxidized alkoxysilane or alkoxysilanes are poured.

In any case, after pouring of the alkoxysilanes, the mixture is stirred at ambient temperature for about 24 hours. Most of the water that has not participated in the reaction and the alcohols resulting from hydrolysis of the alkoxysilanes is then distilled with stirring and under reduced pressure, at a temperature not exceeding 30° C.; and this distillation is stopped when the dry extract of the residue is between 50 and 85% by weight. The residue is then diluted with the mixture of solvents selected to bring the dry extract to between 25 and 45% by weight. The melamine-formaldehyde resin or the urea-formaldehyde resin is then added to the varnish, as are also the optional secondary adjuvants and hardening catalyst.

The completed varnishes are applied to the cleaned surface of the substrates to be coated by any known means such as immersion, application by brush or roller, coating by rotation or flow, spraying ... This last means is preferred. A standard air gun is used for this purpose. The thickness of the hardened coatings is generally between 1 and 30 micrometers, a thickness of about 5 to 10 micrometers most often be suitable. After a predrying in the air for 10 to 30 minutes, the varnish is baked at a temperature of about 120° C. for a period of an hour or two, to assure its hardening.

DETAILED DESCRIPTION OF THE INVENTION

Varnishes according to the invention and various varnishes prepared by way of comparison were tested on test pieces of LEXAN LS 2-111, registered trademark of the GENERAL ELECTRIC CO., for a polycarbonate. The test pieces were previously cleaned with a mixture of isopropanol and ethanol. The varnishes were brought to 30% by weight of dry extract by dilution with a mixture of solvents containing 40% toluene, 24% ethyl glycol acetate, 19% cyclohexanone and 17% ethyl glycol. The varnishes were applied to the surface of the polycarbonate test pieces with an air gun so that the thickness of the dry film was between 5 and 10 micrometers. After air-drying, they were baked at 120° C. for periods of 1 to 2 hours depending on their composition.

The following test methods were applied to evaluate the qualities of the coatings:

Adherence

The test was made according to French standard T 30038, which consisted in incising the varnish film to the support by making a grid. This test was completed by a pull-off test with an adhesive tape (SCOTCH tape, registered trademark of MINNESOTA MINING AND MANUFACTURING Co.). For evaluation of the tests, each test was given a grade ranging from 0 to 5. The grade 0 corresponding to a perfect adherence, while the grade 5 corresponded to zero adherence.

Pencil hardness

A series of pencils, exhibiting increasing degrees of hardness—6B to B, HB, F, H to 9H—was used for this test. By pencil hardness is understood the designation of the softest pencil which still leaves a writing mark on the varnish film, while the next closest one penetrates into the film leaving a scoring. The apparatus used made it possible to move the pencil slowly over the varnish film at an angle of 45° and under a load of 750 g.

Abrasion

The varnish was applied to polycarbonate disks 100 millimeters in diameter. The abrasion tests were performed with a TABER abrasimeter, model 503, according to French standard T 30015, by using a load of 500 g and by setting the number of cycles at 300. The abrasimeter was made by TELEDYNE TABER, NORTH TONAWANDA, NEW YORK (USA). The grinding wheels used carried the references CS 10 F, and were ground before each test with abrasive disks with reference S.11. The percentage of total transmitted light which, on being passed through the sample, is deflected from its initial direction by dispersion is called "haze." Measurement was made of the percentage of change in the haze (% Δhaze) on a sample, before and after its abrasion, according to standard ASTM D.1003-61, by an apparatus called a "HAZAMETER" and made by GARDNER LABORATORY DIVISION, BETHESDA, MD 20014 (USA).

Behavior in light

The test was made according to French standard T 30057 by a XENOTEST apparatus, model 450. The varnished samples were exposed to the light of a xenon lamp reproducing a spectral emission as close as possible to sunlight through a glass. Regular observations made it possible to following the evolution of the samples. The test was stopped when modifications such as yellowing, cracking, loss of adherence of film, appeared on the samples.

Comparative tests and example given below with their results illustrate in a nonlimiting way the various aspects of the invention.

Comparative test A

This test was made without colloidal silica and without epoxidized alkoxysilane.

In a 1000-ml glass container 250 g of methyltrimethoxysilane was made to react with 100 g of water. The medium was acidified with 20 ml of formic acid to adjust the pH to 3. Hydrolysis was performed with stirring for 24 hours and by cooling the solution so that the temperature did not exceed 45° C.

The methanol formed and the excess water were partially evaporated under reduced pressure and with stirring at a temperature below 30° C. until the volume of the solution was brought to 50% of its initial volume. The resulting composition was diluted with 100 g of isopropanol and 100 g of n-butanol. To the varnish thus diluted was added 2% by weight of a hexamethylmethoxymelamine resin, CYMEL 303 ®. The dry extract was brought to 30% with mixture of solvents and the coating was applied to a polycarbonate surface. The baking period was 2 hours at 120° C. The adherence in the grid test was zero and the pencil hardness had a value of 7H. The film tension was insufficient.

Comparative test B

This test was made without colloidal silica, but with two alkoxysilanes, one epoxidized, the other nonepoxidized.

250 g of methyltrimethoxysilane, 216 g of glycidoxypropyltrimethoxysilane, 150 g of water and 20 ml of formic acid were mixed in a 1000 ml glass container. Hydrolysis was performed as in comparative test A and evaporation was continued until the dry extract content was 75% by weight. The product was diluted to 40% with a mixture in equal parts of n-butanol and isopropanol. Then there was added to the diluted varnish 2% by weight of CYMEL 303 ® resin, then the dry extract brought to 30% with mixture of solvents, S. After application of polycarbonate and air-drying, the varnish was hardened for 2 hours at 120° C. Adherence in the grid test obtained a grade of 0 (total adherence) but the pencil hardness reached only the value of 7H. Use of an epoxidized silane therefore made it possible to obtain a very good adherence but the pencil hardness was not improved in relation to comparative test A. It was the same for the film tension.

Comparative test C

This test was performed in the presence of colloidal silica and a nonepoxidized alkoxysilane. 300 g of colloidal silica LUDOX HS—40 ® which was acidified with 20 ml of formic acid was introduced into a 1000-ml glass container. Then 170 g of methyltrimethoxysilane was poured in slowly when limiting the raising of the temperature to 45° C. Stirring was maintained for 24 hours and evaporation was performed as in comparative test B. The resulting product was diluted to 40% of dry extract by a mixture of n-butanol and isopropanol. Then 2% by weight of CYMEL 303 ® resin was added and the dry extract was brought to 30% by the mixture of solvents, S. After application to polycarbonate, the varnish was hardened for 2 hours at 120° C. Adherence in the grid test obtained a grade 5, i.e., the varnish absolutely did not adhere to the substrate, but the pencil hardness reached the maximum value of 9H. The film tension was very clearly improved in relation to that obtained in comparative tests A and B.

There are indicated below by way of nonlimiting examples, some modes of using the process for making varnishes according to the invention.

EXAMPLE 1

300 g of colloidal silica LUDOX HS—40 ®, which was acidified with 20 ml of formic acid, was introduced into a reactor. Then 137 g of methyltrimethoxysilane was poured in slowly with stirring, while keeping the temperature below 45° C. After all the methyltrimethoxysilane was incorporated, hydrolysis was allowed to continue for 15 minutes and 61 g of glycidoxypropylmethoxysilane was added. Stirring was maintained for 24 hours. By evaporation under vacuum and with stirring, at a temperature below 30° C., the volume of the reaction mass was brought to 50% of its initial volume, which corresponded to a dry extract of 81%. The product was then diluted to a dry extract of 40% by a mixture of isopropanol and n-butanol in equal proportions.

2% by weight of CYMEL 303 ® resin was added to the preparation and the dry extract brought to 30% by addition of the mixture of solvents, S.

After application to polycarbonate, the varnish was hardened for 2 hours at 120° C. The index of refraction of the varnished polycarbonate was 1.659 while that of the unvarnished polycarbonate was 1.586 and that of glass was 1.63.

The results of the tests run on this varnish are shown in table I.

EXAMPLE 2

The operation was as in example 1, but using at the start 210 g of colloidal silica LUDOX HS—40 ® and 210 g of methyltrimethoxysilane and 20 ml of formic acid. After partial hydrolysis of the methyltrimethoxysilane, 79 g of glycidoxypropyltrimethoxysilane was added and allowed to react for 24 hours. At the end of the vacuum concentration, the dry extract was 62%. The product was then diluted to 40% with the mixture of n-butanol and isopropanol.

Then 3% of CYMEL 303 ® resin was added to the preparation and diluted to 30% by the mixture of solvents, S.

The results of application of this varnish to polycarbonate are given in table I.

EXAMPLE 3

The operation was exactly as in example 1, with the same proportions of colloidal silica, methyltrimethoxysilane and glycidoxypropyltrimethoxysilane. 15% of CYMEL 303 ® instead of 2% was added to the preparation diluted to 40%. This proportion of aminoplast resin was greater than the maximum proportion considered usable within the framework of the invention.

After hardening of the varnish deposited on polycarbonate after 2 hours at 120° C., the film exhibited the defect of crazing which, according to French standard T 3001, is an alteration appearing in the form of a surface cracking which here was in a wide, regular network.

Despite this surface defect, it was possible to take measurements of the adherence and pencil hardness the results of which are given in table I.

EXAMPLE 4

The operation was as in example 1, with the same proportions of colloidal silica, methyltrimethoxysilane and glycidoxypropyltrimethoxysilane. But, to the preparation diluted to a dry extract of 40% was added 2% of CYMEL 1116 ® resin instead of CYMEL 303 ®. CYMEL 1116 ® resin is a mixed methylated and ethylated melamine-formaldehyde resin. The dry extract was brought to 30% with the mixture of solvents, S.

The results of application to polycarbonate, after hardening for 2 hours at 120° C., appear in table I.

EXAMPLE 5

The operation was as in example 1, with the same proportions of colloidal silica, methyltrimethoxysilane and glycidoxypropyltrimethoxysilane but to the preparation diluted to 40% of dry extract was added 2% of CYMEL 370 ® instead of CYMEL 303 ®. CYMEL 370 ® resin is a partially methylated melamine-formaldehyde resin. The dry extract is still brought to 30% with the mixture of solvents, S.

Use of this more active resin made it possible to reduce to 1 h 30 min the time of hardening at 120° C. of the varnish deposited on polycarbonate, instead of 2 hours.

The results of its test are given in table I.

EXAMPLE 6

The operation was exactly as in example 1, except 2% of PLASTOPAL AWB resin (registered trademark of BASF company for a plasticized and butylated urea-formaldehyde resin) instead of CYMEL 303 ® resin, was added to the preparation diluted to 40% of dry extract.

Use of this resin made it possible to reduce to 1 hour the time of hardening at 120° C. of the varnish deposited on polycarbonate.

The qualities of the film obtained are given in table I.

EXAMPLE 7

Example 1 was reproduced exactly up to the dilution to 40% of the dry extract and addition of 2% of CYMEL 303 ® resin. Then 0.4.% of TINUVIN 328 ® and 0.2% of TINUVIN 2929 ® of CIBA-GEIGY company was added.

TINUVIN 328 ® is an agent for protection from light, of the class of benzotriazoles. Its role of absorber of ultraviolet radiations made it possible to protect the substrate from photochemical degradation.

TINUVIN 292 ® is an agent for protection from light, of the amino type. Its stabilizing role makes it possible to protect the varnish film from its own photochemical degradation.

The varnish applied to polycarbonate was hardened for 2 hours at 120° C.

The results given in table I show that the use of the light-protection agents makes it possible to improve the behavior of the varnish to the "XENOTEST" without harming its other properties.

TABLE I
RESULTS OF TESTS MADE OF THE COMPOSITIONS OF EXAMPLES 1 TO 7

| Examples | Hardening Conditions | Adherence Grade 0 to 5 | Pencil Hardness | Taber "H" Abrasion Test | Appearance of Film | Behavior during Xenotest |
|---|---|---|---|---|---|---|
| 1 | 2 hrs at 120° C. | 0 | 9H | 2.5 | Good tension, clear | >1500 hrs |
| 2 | 2 hrs at 120° C. | 0 | 9H | 3.0 | Good tension, clear | >1500 hrs |
| 3 | 2 hrs at 120° C. | 0 | 9H | | Crazing | |
| 4 | 2 hrs at 120° C. | 0 | 9H | 0.8 | Good tension, clear | |
| 5 | 1 hr at 120° C. | 0 | 9H | 2.0 | Good tension, clear | |
| 6 | 1 hr at 120° C. | 0 | 9H | 2.0 | Good tension, clear | >1500 hrs |
| 7 | 2 hrs at 120° C. | 0 | 9H | 2.6 | Good tension, clear | >2000 hrs |

We claim:

1. A hard, abrasion-resistant varnish for coating the surfaces of solid substrates, comprising a solvent containing:
   a. 4 to 90% by weight of the total of constituents (a), (b), and (c), of a colloidal silica;
   b. 9 to 95% by weight of the total of constituents (a), (b), and (c), of the product of hydrolysis and partial condensation, in the presence of (a), of at least one nonepoxidized trialkoxysilane having the formula $$R-Si-(OR')_3$$

wherein R is a radical selected form the group consisting of alkyl radicals having from 1 to 4 carbon atoms, chloro-3-propyl, trifluoro-3,3,3-propyl, mercapto-3-propyl, methacryloxy-3-propyl, vinyl, and phenyl; and R' is an alkoxyalkyl radical having from 2 to 4 carbon atoms;
   c. 1 to 87% by weight of the total of constituents (a), (b), and (c) of the product of hydrolysis and partial condensation, in the presence of (a) and (b), of at least one epoxidized trialkyloxysilane of the formula $$R''-Si-(OR')_3$$

wherein R'' represents a radical containing an epoxide group;
   d. 0.5 to 9% by weight of the total of constituents (a), (b), and (c), of a soluble aminoplast resin (d), selected from the group consisting of melamine-formaldehyde and ureaformaldehyde resins.

2. The varnish of claim 1 wherein a part of constituent (b), up to 30% of constituent (b), is replaced by the product of hydrolysis and partial condensation of a compound selected from the group consisting of a nonepoxidized dialkyldialkoxysilane, a tetraalkoxysilane, and mixtures thereof.

3. The varnish of claim 1 wherein the solid materials constitute from 10 to 50% by weight in a vehicle consisting of a mixture of water and miscible organic solvents.

4. The varnish of claim 2 wherein the solid materials constitute from 10 to 50% by weight in a vehicle consisting of a mixture of water and miscible organic solvents.

5. The varnish of claim 1 including a hardening acid catalyst.

6. The varnish of claim 2 including a hardening acid catalyst.

7. The varnish of claim 3 including a hardening acid catalyst.

8. The varnish of claim 4 including a hardening acid catalyst.

9. The varnish of claim 1 including at least one secondary adjuvant selected from the group consisting of dyes, surface tension agents, or agents for protection from light.

10. A process for preparing a varnish comprising (1) polysiloxanes, (2) colloidal silica, (3) a soluble aminoblast resin and (4) solvent, comprising the steps of:
   a. forming component (1) by:
      (i) hydrolyzing and partially condensing a nonepoxidized trialkoxysilane having the formula:

$$R-Si-(OR')_3$$

wherein R is a radical selected from the group consisting of alkyl radicals having from 1 to 4 carbon atoms, chloro-3-propyl, trifluoro-3,3,3-propyl, mercapto-3-propyl, methacryloxy-3-propyl, vinyl, and phenyl; and R' is an alkoxyalkyl radical having from 2 to 4 carbon atoms, in the presence of 4 to 90%, by weight of the total of constituents (1) and (2), of component (2);
      (ii) hydrolyzing and partially condensing an epoxidized trialkoxysilane having the formula:

$$R''-Si-(OR')_3$$

wherein R' represents a radical containing an epoxide group, in the presence of the products of a(i); and
   (b) mixing 9 to 95%, by weight of the total of constituents (1) and (2), of the product of step a(ii) with:
      (i) 0.5 to 9%, based on the weight of the total of constituents (1) and (2), of component (3), and
      (ii) component (4).

11. A process for coating a solid substrate with a varnish, said varnish comprising a solvent containing:
   a. 4 to 90% by weight of the total of constituents (a), (b), and (c), of a colloidal silica;
   b. 9 to 95% by weight of the total of constituents (a), (b), and (c), of the product of hydrolysis and partial condensation, in the presence of (a), of at least one nonepoxidized trialkoxysilane having the formula $$R-Si-(OR')_3$$

wherein R is a radical selected form the group consisting of alkyl radicals having from 1 to 4 carbon atoms, chloro-3-propyl, trifluoro-3,3,3-propyl, mercapto-3-propyl, methacryloxy-3-propyl, vinyl, and phenyl; and R' is an alkoxyalkyl radical having from 2 to 4 carbon atoms;

c. 1 to 87% by weight of the total of constituents (a), (b), and (c) of the product of hydrolysis and partial condensation, in the presence of (a) and (b), of at least one epoxidized trialkyloxysilane of the formula $$R''-Si-(OR')_3$$

wherein R'' represents a radical containing an epoxide group;

d. 0.5 to 9% by weight of the total of constituents (a), (b), and (c), of a soluble aminoplast resin (d), selected from the group consisting of melamine-formaldehyde and ureaformaldehyde resins, said process comprising the steps of contacting the substrate with the varnish and heating the substrate and varnish to a temperature of 120° C. for a period of up to two hours.

12. The varnish of claim 1, consisting essentially of said solvent containing said constituents (a), (b), (c) and (d).

* * * * *